US010338872B2

(12) United States Patent
Tatsukawa et al.

(10) Patent No.: US 10,338,872 B2
(45) Date of Patent: Jul. 2, 2019

(54) DISPLAY DEVICE, CONTROL DEVICE, DISPLAY METHOD, AND PROGRAM

(71) Applicant: SEIKO EPSON CORPORATION, Tokyo (JP)

(72) Inventors: Munemasa Tatsukawa, Beppu (JP); Kento Yamada, Beppu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/684,122

(22) Filed: Aug. 23, 2017

(65) Prior Publication Data
US 2018/0060011 A1  Mar. 1, 2018

(30) Foreign Application Priority Data
Aug. 29, 2016 (JP) ................. 2016-166551

(51) Int. Cl.
G03B 21/14 (2006.01)
H04L 29/08 (2006.01)
G06F 3/14 (2006.01)
H04N 21/41 (2011.01)
H04N 21/436 (2011.01)
H04N 21/485 (2011.01)

(52) U.S. Cl.
CPC .......... G06F 3/1423 (2013.01); G03B 21/14 (2013.01); H04N 21/4108 (2013.01); H04N 21/4122 (2013.01); H04N 21/43615 (2013.01); H04N 21/485 (2013.01); G09G 2356/00 (2013.01); G09G 2360/04 (2013.01)

(58) Field of Classification Search
CPC .. H04N 9/3147; H04N 9/3179; H04N 9/3194; H04N 5/74; G03B 21/14; G03B 21/26; G03B 21/00; H04L 67/18
See application file for complete search history.

(56) References Cited

U.S. PATENT DOCUMENTS

| 8,086,704 | B2 | 12/2011 | Honma |
| 8,403,506 | B2 | 3/2013 | Suzuki |
| 2005/0157218 | A1 | 7/2005 | Honma |
| 2011/0043163 | A1* | 2/2011 | Baarman ................. H02J 5/005 320/108 |
| 2011/0066259 | A1 | 3/2011 | Suzuki |
| 2011/0082903 | A1 | 4/2011 | Honma |
| 2017/0142380 | A1* | 5/2017 | Chen ................. G06F 17/30247 |

FOREIGN PATENT DOCUMENTS

| JP | 2007-43725 A | 2/2007 |
| JP | 2011-66531 A | 3/2011 |

* cited by examiner

Primary Examiner — Ryan D Howard
(74) Attorney, Agent, or Firm — Oliff PLC

(57) ABSTRACT

A display device includes: a display unit; a receiving unit that receives first information corresponding to the installation location of a first display device, second information corresponding to the installation location of a second display device, and third information corresponding to the installation location of the display device; and a control unit that causes the display unit to display an image representing the first display device preferentially over the second display device when the installation location of the first display device corresponding to the first information is closer to the installation location of the display device corresponding to the third information than the installation location of the second display device corresponding to the second information.

8 Claims, 8 Drawing Sheets

[ PROJECTOR SELECTION ]　　　　　　　　　　　RETURN

|  | PROJECTOR NAME | MODEL NUMBER | IP ADDRESS | INSTALLATION LOCATION |
|---|---|---|---|---|
| ☐ | PJ_1 | XXXXX | 192.168.100.XX1 | Room.A |
| ☐ | PJ_2 | XXXXX | 192.168.100.XX2 | Room.A |
| Master | PJ_3 | XXXXX | 192.168.100.XX3 | Room.A |

FIG. 4

| | PROJECTOR NAME | MODEL NUMBER | IP ADDRESS | INSTALLATION LOCATION |
|---|---|---|---|---|
| ☐ | PJ_1 | XXXXX | 192.168.100.XX1 | Room.A |
| ☐ | PJ_2 | XXXXX | 192.168.100.XX2 | Room.A |
| Master | PJ_3 | XXXXX | 192.168.100.XX3 | Room.A |
| ☐ | PJ_4 | XXXXX | 192.168.100.XX4 | Room.B |
| ☐ | PJ_5 | XXXXX | 192.168.100.XX5 | Room.B |
| ☐ | PJ_6 | XXXXX | 192.168.100.XX6 | Room.C |

[ PROJECTOR SELECTION ]   RETURN

DISPLAY DEVICE, CONTROL DEVICE, DISPLAY METHOD, AND PROGRAM

CROSS-REFERENCE

The entire disclosure of Japanese Patent Application No. 2016-166551, filed Aug. 29, 2016 is expressly incorporated by reference herein.

BACKGROUND

1. Technical Field

The present invention relates to a technique for displaying an image regarding a display device.

2. Related Art

JP-A-2007-43725 discloses a projector selection system, by which a list showing the IP addresses and projector names of usable projectors is displayed and a projector to be used can be selected from the list.

When an image is displayed using a plurality of display devices (e.g., a plurality of projectors), display devices whose installation locations are close to each other (e.g., display devices installed in the same conference room) are used in many cases.

The list disclosed in JP-A-2007-43725 is a list simply showing the IP addresses and projector names of usable projectors and therefore has a problem in that it is difficult to select a projector (display device) whose installation location is close. This problem is not limited to the case where the display device is a projector but also occurs when the display device is a display device other than a projector.

SUMMARY

An advantage of some aspects of the invention is to make a display device whose installation location is close more likely to be selected.

A display device according to an aspect of the invention includes: a display unit; a receiving unit that receives first information corresponding to an installation location of a first display device, second information corresponding to an installation location of a second display device, and third information corresponding to an installation location of the display device; and a control unit that causes the display unit to display an image representing the first display device preferentially over the second display device when the installation location of the first display device corresponding to the first information is closer to the installation location of the display device corresponding to the third information than the installation location of the second display device corresponding to the second information.

According to the aspect, the first display device whose installation location is closer to the display device than the second display device is displayed preferentially over the second display device. For this reason, the first display device whose installation location is close to the display device is more likely to be selected.

In the aspect of the display device described above, it is preferable that the display device further includes: a communication unit that receives the first information from the first display device and receives the second information from the second display device; and a storage unit that stores the third information, and that the receiving unit receives the first information and the second information from the communication unit and receives the third information from the storage unit.

According to the aspect with this configuration, it is possible to receive the information regarding the installation locations of the other display devices from the other display devices. For this reason, it is not necessary for the individual display devices to previously store the information regarding the installation locations of the other display devices.

As the aspect of the display device described above, it is preferable that the communication unit transmits, in response to an information request from an another display devices, the third information to the another display devices.

According to the aspect with this configuration, the third information can be transmitted to the other display devices in response to the request from the other display devices. For this reason, it is possible to provide the third information to the other display devices that need the third information.

As the aspect of the display device described above, it is preferable that when the installation location of the first display device is the same as the installation location of the display device and the installation location of the second display device is different from the installation location of the display device, the control unit causes the display unit to display, as the image, a first image representing the first display device without representing the second display device.

According to the aspect with this configuration, the first display device whose installation location is common with the display device is more likely to be selected.

As the aspect of the display device described above, it is preferable that the control unit causes the display unit to display, as the image, a second image in which the first display device and the second display device are sorted in order of closeness to the installation position of the display device.

According to the aspect with this configuration, it is easy to make a selection based on, for example, the installation location.

A control device according to an aspect of the invention includes: a receiving unit that receives first information corresponding to an installation location of a first display device, second information corresponding to an installation location of a second display device, and third information corresponding to an installation location of the control device; and a control unit that causes a display unit to display an image representing the first display device preferentially over the second display device when the installation location of the first display device corresponding to the first information is closer to the installation location of the control device corresponding to the third information than the installation location of the second display device corresponding to the second information.

According to the aspect, the first display device whose installation location is close to the control device is more likely to be selected.

A display method according to an aspect of the invention is a display method performed by a display device. The display method includes: receiving first information corresponding to an installation location of a first display device, second information corresponding to an installation location of a second display device, and third information corresponding to an installation location of the display device; and displaying an image representing the first display device preferentially over the second display device when the installation location of the first display device corresponding to the first information is closer to the installation location of the display device corresponding to the third information than the installation location of the second display device corresponding to the second information.

According to the aspect, the first display device whose installation location is close to the display device is more likely to be selected.

A display method according to another aspect of the invention is a display method performed by a control device. The display method includes: receiving first information corresponding to an installation location of a first display device, second information corresponding to an installation location of a second display device, and third information corresponding to an installation location of the control device; and causing a display unit to display an image representing the first display device preferentially over the second display device when the installation location of the first display device corresponding to the first information is closer to the installation location of the control device corresponding to the third information than the installation location of the second display device corresponding to the second information.

According to the aspect, the first display device whose installation location is close to the control device is more likely to be selected.

A program according to an aspect of the invention causes a computer to execute: a receiving procedure for receiving first information corresponding to an installation location of a first display device, second information corresponding to an installation location of a second display device, and third information corresponding to an installation location of the computer; and a display procedure for causing a display unit to display an image representing the first display device preferentially over the second display device when the installation location of the first display device corresponding to the first information is closer to the installation location of the computer corresponding to the third information than the installation location of the second display device corresponding to the second information.

According to the aspect, the first display device whose installation location is close to the computer is more likely to be selected.

BRIEF DESCRIPTION OF THE DRAWINGS

The invention will be described with reference to the accompanying drawings, wherein like numbers reference like elements.

FIG. 4 shows one example of a selection image.

FIG. 7 shows one example of a selection image.

DESCRIPTION OF EXEMPLARY EMBODIMENTS

Figure 1:
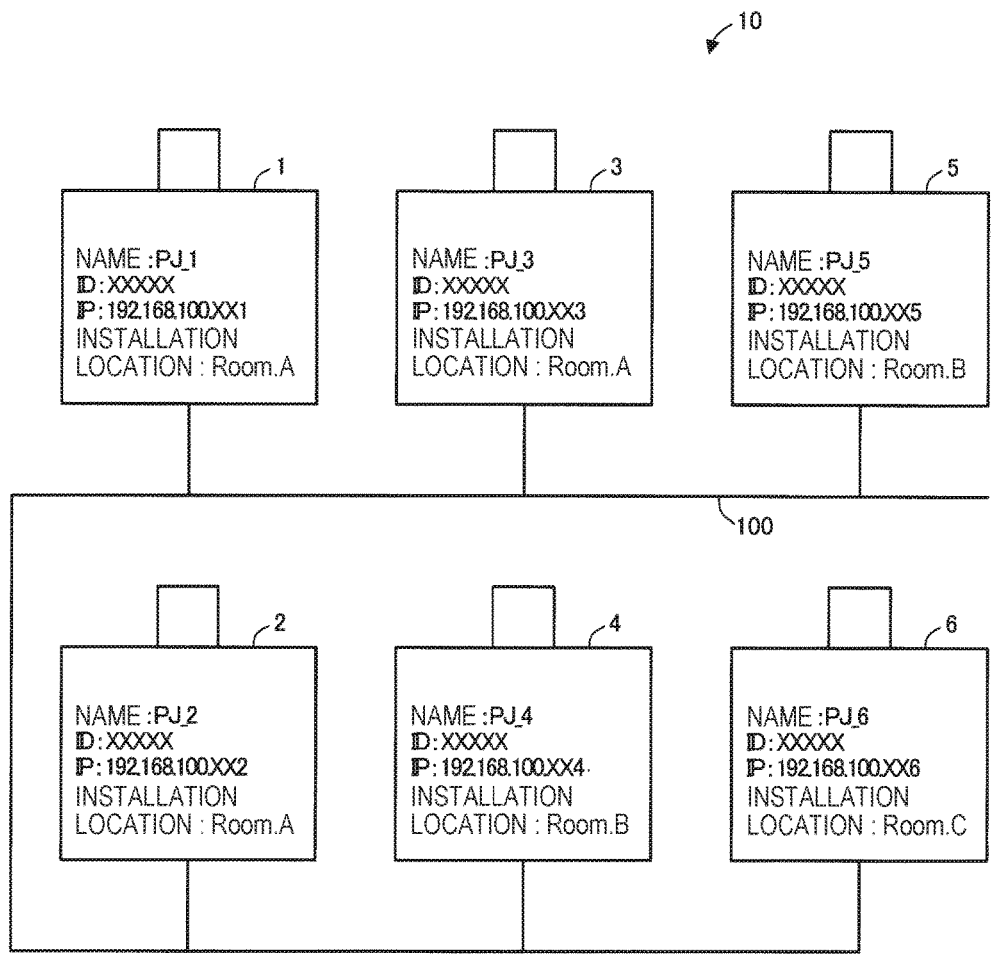
FIG. 1 shows a display system including a projector according to a first embodiment.

Hereinafter, embodiments according to the invention will be described with reference to the drawings. The dimension and scale of each portion are appropriately different from actual ones in the drawings. Moreover, the embodiments described below are preferred specific examples of the invention. For this reason, technically preferred various limitations are imposed on the embodiments. However, the scope of the invention is not limited to the embodiments unless a description for limiting the invention is specifically made in the following description.

First Embodiment

FIG. 1 shows an overall configuration of a display system 10 including a projector 3 according to a first embodiment. The projector is one example of a display device.

The display system 10 includes projectors 1 to 6. The projectors 1 to 6 are connected to a network 100 and can communicate with each other. It is assumed that the projectors 1 to 3 are installed in a conference room A (Room. A), that the projectors 4 and 5 are installed in a conference room B (Room. B), and that the projector 6 is installed in a conference room C (Room. C). The projectors 1 and 2 are each one example of a first display device. The projectors 4 to 6 are each one example of a second display device.

The projector 1 stores projector information (a name, a model number, an IP address, and installation location information) regarding the projector 1. Specifically, the projector 1 stores "PJ_1" as a name, stores "XXXXX" as a model number (ID), stores "192.168.100.XX1" as an IP address, and stores "Room. A" (the conference room A) as installation location information. The installation location information of the projector 1 is one example of first information corresponding to the installation location of the projector 1.

The projector 2 stores projector information (a name, a model number, an IP address, and installation location information) regarding the projector 2. Specifically, the projector 2 stores "PJ_2" as a name, stores "XXXXX" as a model number (ID), stores "192.168.100.XX2" as an IP address, and stores "Room. A" (the conference room A) as installation location information. The installation location information of the projector 2 is one example of the first information corresponding to the installation location of the projector 2.

The projector 3 stores projector information (a name, a model number, an IP address, and installation location information) regarding the projector 3. Specifically, the projector 3 stores "PJ_3" as a name, stores "XXXXX" as a model number (ID), stores "192.168.100.XX3" as an IP address, and stores "Room. A" (the conference room A) as installation location information. The installation location information of the projector 3 is one example of third information corresponding to the installation location of the projector 3.

The projector 4 stores projector information (a name, a model number, an IP address, and installation location information) regarding the projector 4. Specifically, the projector 4 stores "PJ_4" as a name, stores "XXXXX" as a model number (ID), stores "192.168.100.XX4" as an IP address, and stores "Room. B" (the conference room B) as installation location information. The installation location information of the projector 4 is one example of second information corresponding to the installation location of the projector 4.

The projector 5 stores projector information (a name, a model number, an IP address, and installation location information) regarding the projector 5. Specifically, the projector 5 stores "PJ_5" as a name, stores "XXXXX" as a model number (ID), stores "192.168.100.XX5" as an IP address, and stores "Room. B" (the conference room B) as installation location information. The installation location information of the projector 5 is one example of the second information corresponding to the installation location of the projector 5.

The projector 6 stores projector information (a name, a model number, an IP address, and installation location information) regarding the projector 6. Specifically, the projector 6 stores "PJ_6" as a name, stores "XXXXX" as a model number (ID), stores "192.168.100.XX6" as an IP address, and stores "Room. C" (the conference room C) as installation location information. The installation location information of the projector 6 is one example of the second information corresponding to the installation location of the projector 6.

The projectors 1 to 6 include common components.

Figure 2:
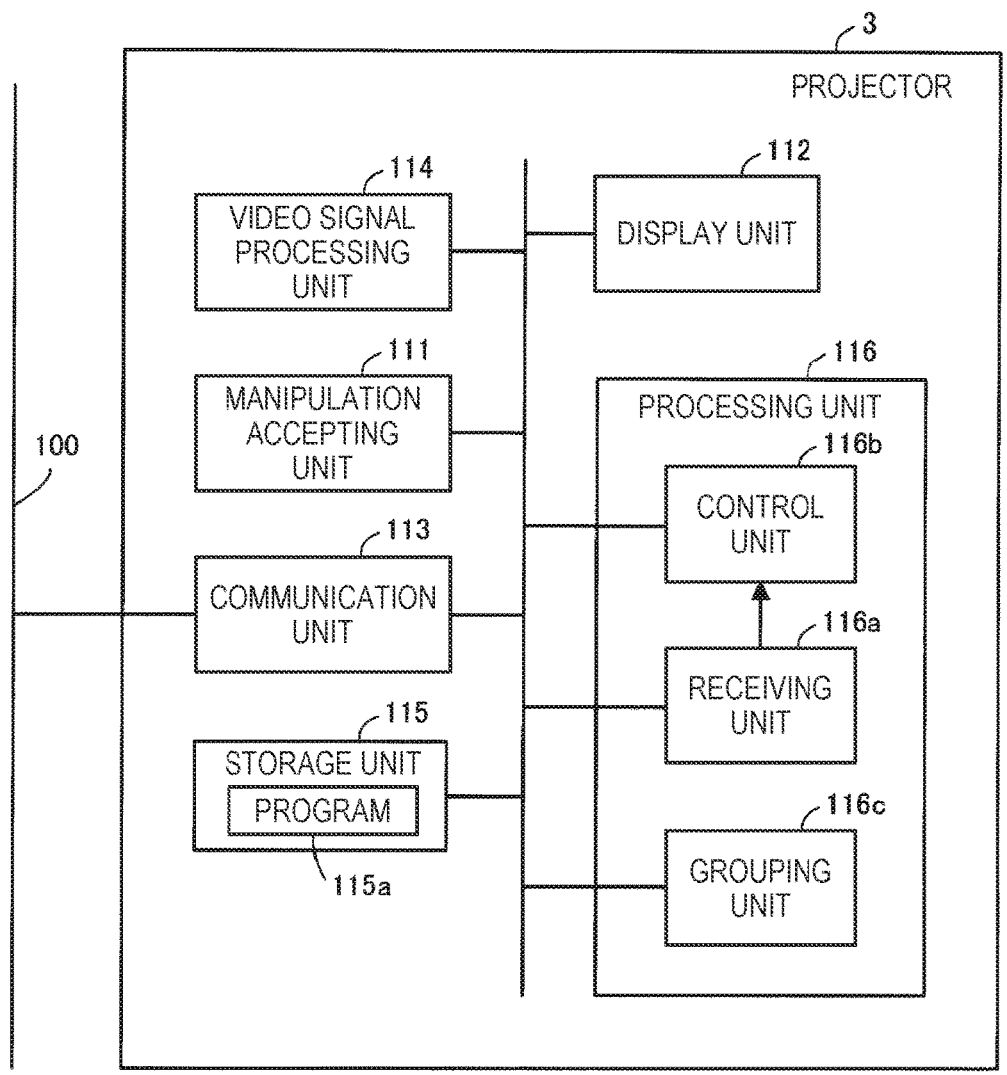
FIG. 2 shows a configuration example of the projector.

FIG. 2 shows a configuration example of the projector 3. The projectors 1, 2, and 4 to 6 also include configurations similar to those of the projector 3; therefore, the configurations of the projector 3 will be described as a representative of the projectors.

The projector 3 is configured to include a manipulation accepting unit 111, a display unit 112, a communication unit 113, a video signal processing unit 114, a storage unit 115, and a processing unit 116.

The manipulation accepting unit 111 includes a plurality of manipulation buttons for manipulating the projector 3. The display unit 112 displays various images. For example, the display unit 112 projects various images onto a projection surface (not shown) to display the various images. The display unit 112 does not include the projection surface.

The communication unit 113 communicates with the projectors 1, 2, and 4 to 6 via the network 100. For example, the communication unit 113 transmits an information request to request the projector information to the projectors 1, 2, 4, 5, and 6. Moreover, the communication unit 113 receives a response (the projector information including a name, a model number, an IP address, and installation location information) to the information request from each of the projectors 1, 2, 4, 5, and 6.

When the communication unit 113 receives the information request from the other projectors (e.g., any of the projectors 1, 2, 4, 5, and 6), the communication unit 113 transmits the projector information (information including the name, model number, IP address, and installation location information of the projector 3) regarding the projector 3 as a response to the information request to the sender of the information request.

Moreover, the communication unit 113 receives a video signal from a not-shown video signal source (e.g., a personal computer).

The video signal processing unit 114 executes the process of converting the video signal received by the communication unit 113 to a signal suitable for display in the display unit 112. This process includes, for example, a scaling process by which the resolution of a video represented by the video signal is adjusted to the resolution of the display unit 112 by enlarging or reducing the video.

The storage unit 115 is one example of a computer-readable recording medium. Further, the storage unit 115 is a non-transitory recording medium. The storage unit 115 is, for example, a known recording medium in any form such as a semiconductor recording medium, a magnetic recording medium, or an optical recording medium, or a recording medium obtained by combining the recording media. In the specification, the "non-transitory" recording medium includes all computer-readable recording media except for a recording medium, such as a transmission line, that temporarily stores a transitory, propagating signal, and does not exclude a volatile recording medium.

The storage unit 115 stores a program 115a for defining the operation of the projector 3, and various information (e.g., the projector information regarding the projector 3). The program 115a may be provided in the form of distribution via the network 100 and then installed in the storage unit 115.

The processing unit 116 is a processing device (computer) such as a central processing unit (CPU). The processing unit 116 reads the program 115a from the storage unit 115 and executes the program 115a to thereby realize a receiving unit 116a, a control unit 116b, and a grouping unit 116c.

The receiving unit 116a receives the projector information regarding the projector 3 from the storage unit 115 and receives the projector information of each of the projectors 1, 2, 4, 5, and 6 from the communication unit 113.

The control unit 116b controls the projector 3. For example, the control unit 116b specifies the installation position of each of the projectors 1 to 6 using the projector information (specifically, installation location information) of each of the projectors 1 to 6. When the installation locations of the projectors 1 and 2 are closer to the installation location of the projector 3 than the installation locations of the projectors 4 to 6, the control unit 116b causes the display unit 112 to display an image (hereinafter also referred to as a "selection image") representing the projectors 1 and 2 preferentially over the projectors 4 to 6. The projector displayed in the selection image is a selection candidate projector. Hereinafter, the selection candidate projector is also referred to as a "candidate projector".

For example, the control unit 116b causes the display unit 112 to display, as the selection image, an image (hereinafter also referred to as a "first image") representing the projectors (specifically, the projectors 1 and 2) whose installation locations are the same as the projector 3 without representing the projectors (specifically, the projectors 4 to 6) whose installation locations are different from the projector 3.

The projector 3 is also represented in the selection image.

The grouping unit 116c groups projectors selected by the user using the manipulation accepting unit 111 from the projectors (candidate projectors) displayed in the display unit 112 by the control unit 116b. Grouping is a known technique, and therefore, a detailed description thereof is omitted.

Figure 3:
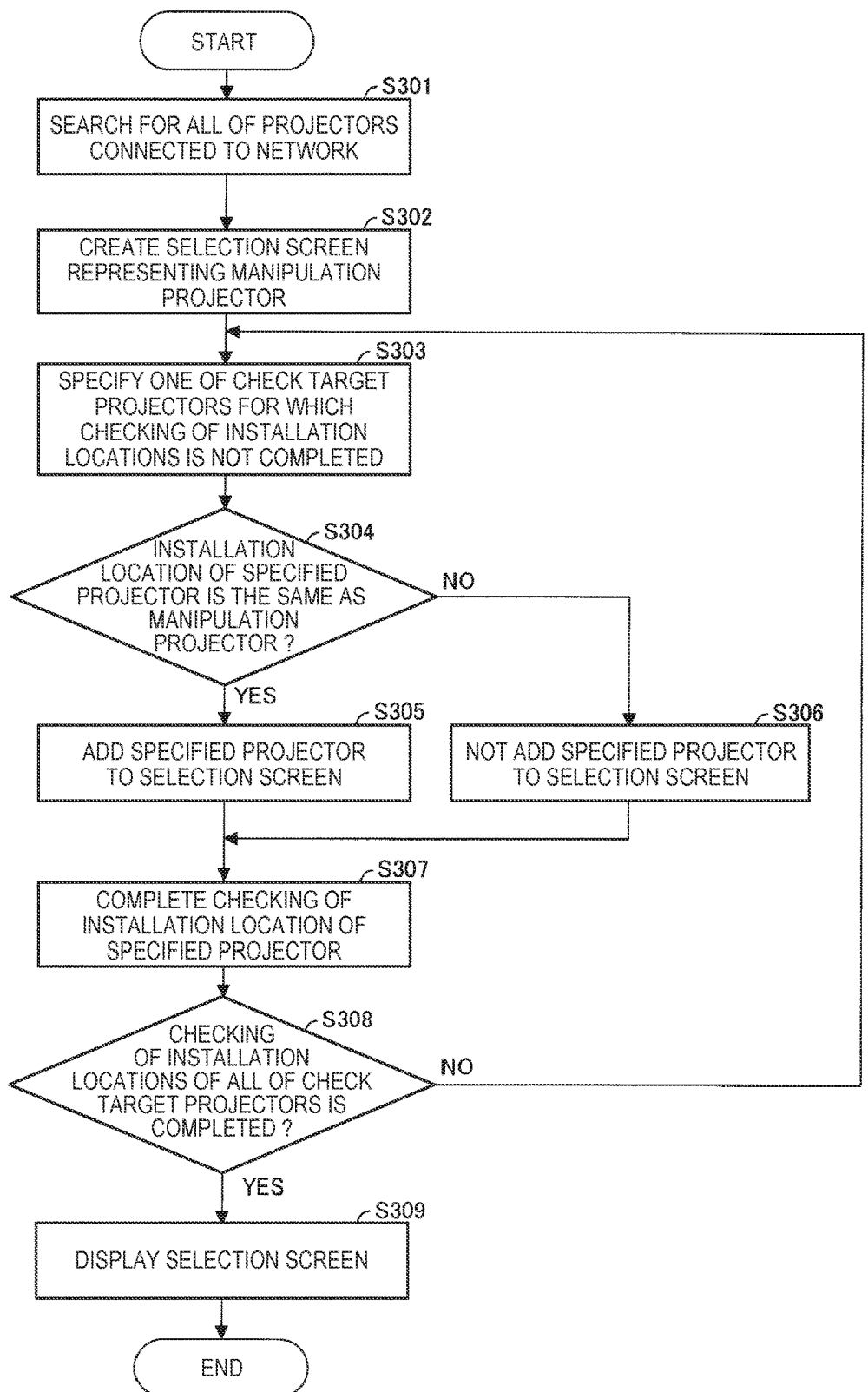
FIG. 3 is a flowchart for explaining the operation of the projector.

Next, operation will be described. FIG. 3 is a flowchart for explaining the operation of the projector 3. Hereinafter, the projector 3 is also referred to as a "manipulation projector".

First, when the user manipulates the manipulation accepting unit 111 to instruct to start searching for projectors, the communication unit 113 searches for all of the projectors connected to the network 100 (Step S301).

The following process is executed in Step S301.

First, the communication unit 113 broadcasts the information request to projectors (hereinafter also referred to as "check target projectors") other than the manipulation projector in all of the projectors connected to the network 100.

When receiving the information request from the projector 3, the communication unit 113 of each of the check target projectors (the projectors 1, 2, 4, 5, and 6 in this example) transmits the projector information stored in the storage unit 115 of its own projector to the projector 3 as a response to the information request. Hereinafter, it is assumed that the projectors 1, 2, 4, 5, and 6 transmit the responses to the information requests to the projector 3.

When receiving the responses of the projectors 1, 2, 4, 5, and 6, the communication unit 113 of the projector 3 outputs the responses to the receiving unit 116*a*. When receiving the responses of the projectors 1, 2, 4, 5, and 6, the receiving unit 116*a* outputs the responses to the control unit 116*b*.

Subsequently, the receiving unit 116*a* sends the address of an area where the projector information of the projector 3 (manipulation projector) is stored to the storage unit 115, and receives the projector information of the projector 3 from the storage unit 115. Subsequently, the receiving unit 116*a* outputs, as the projector information of the manipulation projector, the projector information of the projector 3 to the control unit 116*b*.

The above description is the process executed in Step S301.

When receiving the projector information of the manipulation projector, the control unit 116*b* creates the selection image representing the projector information of the manipulation projector (Step S302). The control unit 116*b* appends identification information (e.g., the characters "Master") meaning the manipulation projector to the projector information of the manipulation projector in the selection image.

Subsequently, the control unit 116*b* performs checking of the installation locations of the check target projectors one by one.

First, the control unit 116*b* specifies one of the check target projectors for which checking of the installation location is not completed (Step S303).

Subsequently, the control unit 116*b* determines whether or not the installation location of the projector (hereinafter referred to as a "specified projector") specified in Step S303 is the same as the installation location of the manipulation projector (Step S304). Specifically, the control unit 116*b* determines in Step S304 whether or not the installation location information of the specified projector is the same as the installation location information of the manipulation projector.

If the installation location information of the specified projector is the same as the installation location information of the manipulation projector (YES in Step S304), the control unit 116*b* adds the projector information of the specified projector to the selection image (Step S305). Thereafter, the control unit 116*b* executes Step S307. On the other hand, if the installation location information of the specified projector is different from the installation location information of the manipulation projector (NO in Step S304), the control unit 116*b* executes Step S307 without adding the projector information of the specified projector to the selection image (Step S306).

For this reason, the manipulation projector and the projector whose installation location is the same as the manipulation projector are represented in the selection image.

In Step S307, the control unit 116*b* completes the checking of the installation location of the specified projector specified in Step S303.

Subsequently, the control unit 116*b* determines whether or not the checking of the installation locations of all of the check target projectors is completed (Step S308).

If the checking of the installation locations of all of the check target projectors is not completed (NO in Step S308), the control unit 116*b* returns the process to Step S303 and newly specifies a check target projector.

On the other hand, if the checking of the installation locations of all of the check target projectors is completed (YES in Step S308), the control unit 116*b* causes the display unit 112 to display the selection image (Step S309), and then ends the process.

FIG. 4 shows one example of a selection image M1.

In the example shown in FIG. 4, the identification information of the characters "Master" is appended to the projector information of the projector 3 as the manipulation projector, and the projector information of the projectors 1 and 2 whose installation locations (Room. A: the conference room A) are the same as the manipulation projector is displayed in addition to the projector information of the manipulation projector.

The user selects projectors to be grouped using the selection image M1. In the embodiment, since only the projectors whose installation locations are the same as the manipulation projector are represented in the selection image M1, the user can easily select the projector whose installation location is the same as the manipulation projector.

Second Embodiment

In the first embodiment, only the check target projectors whose installation locations are the same as the manipulation projector are represented in the selection image M1. In contrast to this, in a second embodiment of the invention, a second image in which check target projectors (first display devices) whose installation locations are the same as the manipulation projector and check target projectors (second display devices) whose installation locations are different from the manipulation projector are sorted in order of closeness to the installation position of the manipulation projector is displayed as the selection image.

Figure 5:
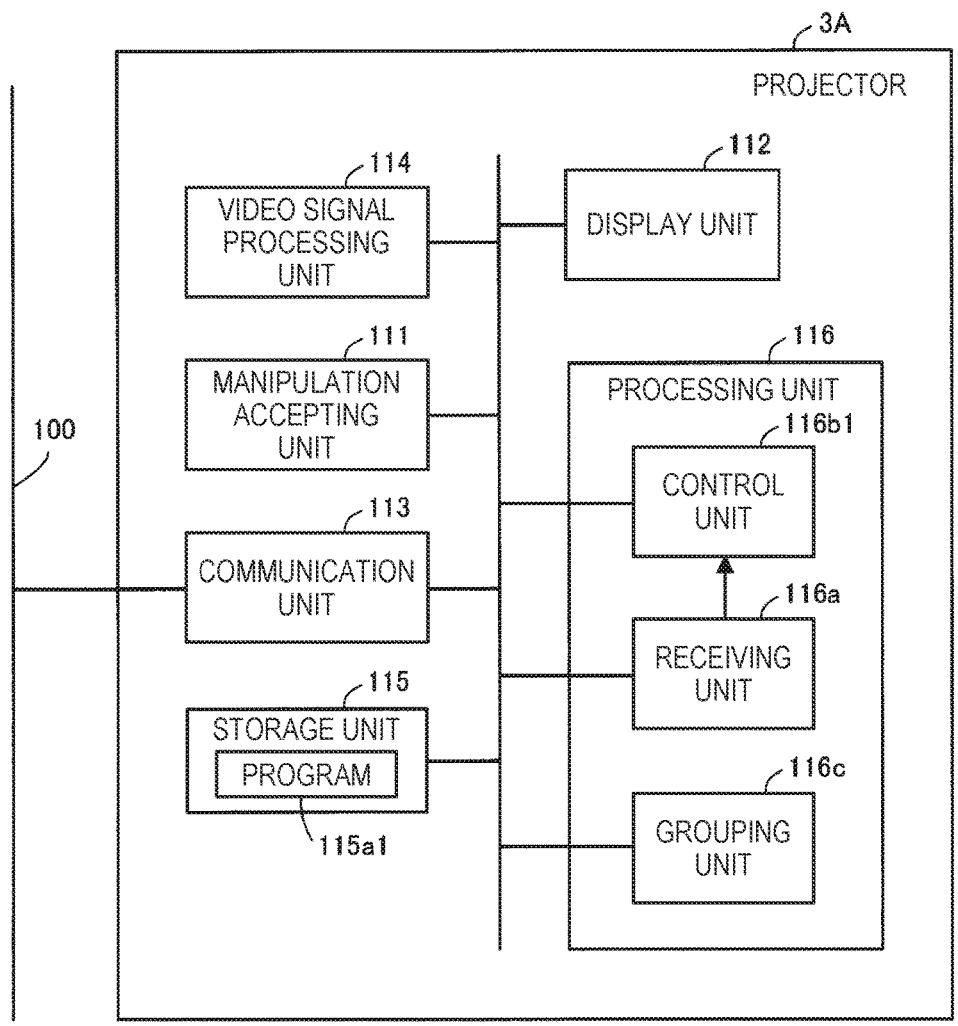
FIG. 5 shows a projector according to a second embodiment.

FIG. 5 shows a projector 3A according to the second embodiment. In FIG. 5, the same configurations as those shown in FIG. 2 are denoted by the same reference numerals and signs. The projector 3A shown in FIG. 5 can be replaced with any of the projectors 1 to 6 shown in FIG. 1.

The projector 3A according to the second embodiment differs from the projector 3 of the first embodiment in that the storage unit 115 stores a program 115*a*1 instead of the program 115*a* and that the processing unit 116 reads and executes the program 115*a*1 to thereby realize the receiving unit 116*a*, a control unit 116*b*1, and the grouping unit 116*c*. Here, as for the processing unit 116, the processing unit 116 includes the control unit 116*b*1 instead of the control unit 116*b*. Hereinafter, the second embodiment will be described focusing on differences from the first embodiment.

The control unit 116*b*1 differs from the control unit 116*b*1 in that the control unit 116*b*1 causes the display unit 112 to display, as the selection image, the second image instead of the first image.

Figure 6:
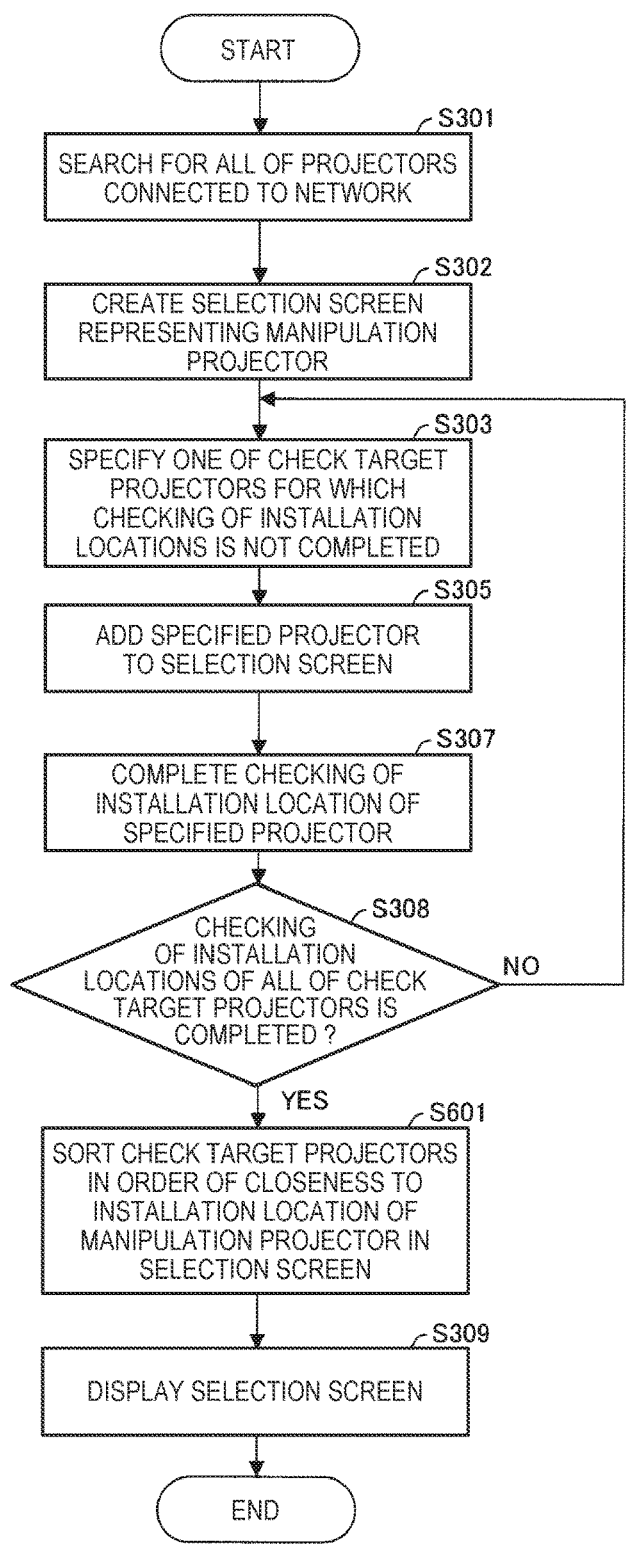
FIG. 6 is a flowchart for explaining the operation of the projector.

Next, operation will be described. FIG. 6 is a flowchart for explaining the operation of the projector 3A. In FIG. 6, the same processes as the processes shown in FIG. 3 are denoted by the same reference numerals and signs.

Hereinafter, the operation of the projector 3A in the situation in which the projector 3A is used instead of the projector 3 shown in FIG. 1 will be described focusing on differences from the processes shown in FIG. 3.

The control unit 116*b*1 executes Step S305 after Step S303, and executes Step S307 after Step S305.

Then, if the checking of the installation locations of all of the check target projectors is completed (YES in Step S308), the control unit 116*b*1 sorts the check target projectors in order of closeness to the installation position of the manipulation projector in the selection image (Step S601).

It is not clear whether or not the distance between the conference room. B and the conference room A is longer than the distance between the conference room C and the conference room A. For this reason, the control unit 116*b*1 executes the sorting on the assumption that as to the projectors 4 and 5 whose installation locations are the conference room B and the projector 6 whose installation location is the conference room C, the installation locations of the projectors are different from the conference room A but are the same location.

In Step S601, the following process, for example, is executed.

The control unit 116*b*1 first selects check target projectors whose installation positions are the same as the manipulation projector and the manipulation projector, and displays the selected projectors at the top of the selection image. On this occasion, when the number of selected projectors is two or more, the control unit 116*b*1 sorts the projectors by the names of the projectors.

Subsequently, the control unit 116*b*1 displays the remaining check target projectors subsequent to the previously selected projectors in the selection image. On this occasion, when the number of remaining check target projectors is two or more, the control unit 116*b*1 sorts the projectors by the installation locations of the projectors. On this occasion, when the check target projectors whose installation locations are the same exist in the remaining check target projectors, the control unit 116*b*1 sorts the projectors by the names of the projectors.

The above description is the process executed in Step S601.

When Step S601 is completed, Step S309 is executed.

FIG. 7 shows one example of a selection image M2 created in the second embodiment.

In the example shown in FIG. 7, the identification information of the characters "Master" is appended to the projector information of the projector 3 as the manipulation projector, and the projector information of the manipulation projector and the projector information of all of the check target projectors (the projectors 1, 2, 4, 5, and 6) are displayed.

The user selects projectors to be grouped using the selection image M2. For this reason, it is easy to make a selection based on the installation location according to the embodiment.

Third Embodiment

As the situation in which projectors are selected (grouped), a situation is also considered, in which, for example, a control device (e.g., a personal computer) serving as a supply source of a video signal is brought into a conference room and the projectors existing in the conference room are selected. In a third embodiment of the invention, the control device such as a personal computer creates the selection screen.

Figure 8:
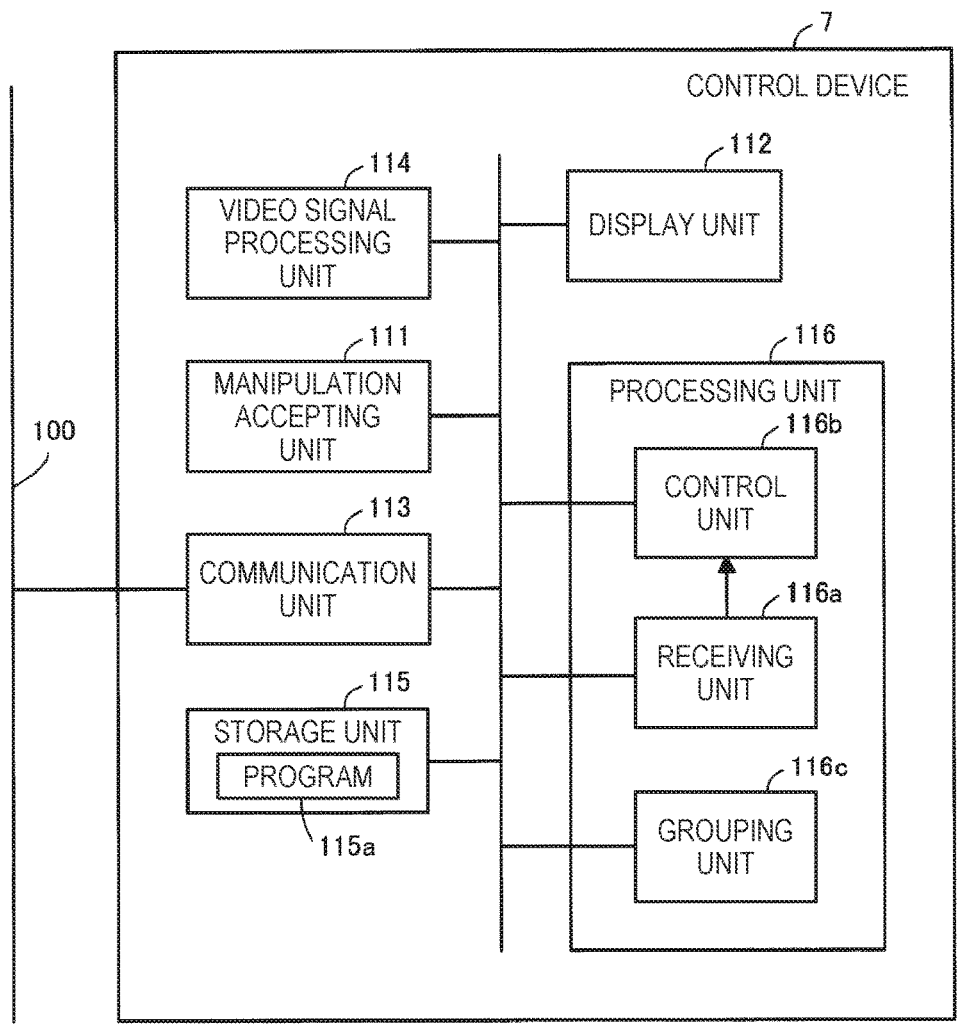
FIG. 8 shows a control device according to a third embodiment.

FIG. 8 shows a control device 7 according to the third embodiment. In FIG. 8, the same configurations as those shown in FIG. 2 are denoted by the same reference numerals and signs. Hereinafter, the control device 7 will be described focusing on differences from the projector 3 shown in FIG. 2.

The control device 7 is, for example, a personal computer serving as a supply source of a video signal. The control device 7 can be moved and is connected to the network 100 shown in FIG. 1 at the destination.

The user manipulates the manipulation accepting unit 111 of the control device 7 to input installation location information indicating the destination (installation location) of the control device 7 to the control device 7. The installation location information input via the manipulation accepting unit 111 is stored in the storage unit 115. For example, when the control device 7 is installed in the conference room A, "Room. A" (the conference room A) is stored as the installation location information.

Thereafter, when the user manipulates the manipulation accepting unit 111 to instruct to start searching for projectors, operation equivalent to that in FIG. 3 is executed. Specifically, in the operation description using FIG. 3, the "projector 3" is replaced with the "control device 7", the "manipulation projector" is replaced with the "control device 7", and the "projectors 1, 2, 4, 5, and 6" are changed to the "projectors 1 to 6".

According to the embodiment, the selection image can be displayed in the control device 7. In the control device 7, the program 115*a*1 may be used instead of the program 115*a*, and the control unit 116*b*1 may be used instead of the control unit 116*b*.

MODIFIED EXAMPLES

The invention is not limited to the embodiments described above, and, for example, various modifications as described below are possible. Moreover, one or a plurality of modifications optionally selected from aspects of the modifications described below can be appropriately combined.

Modified Example 1

The selection image is not limited to the selection images M1 and M2 but can be appropriately changed.

For example, when it is determined that the installation locations of the projectors 1 and 2 are closer to the installation location of the projector 3 (or the control device 7) than the installation locations of the projectors 4 to 6, a selection image in which the projector information of the projectors 1 and 2 is displayed with a font size larger than that of the projector information of the projectors 4 to 6 may be used.

Moreover, when it is determined that the installation locations of the projectors 1 and 2 are closer to the installation location of the projector 3 (or the control device 7) than the installation locations of the projectors 4 to 6, a recommendation mark such as an asterisk may be appended only to the projector information of the projectors 1 and 2.

Modified Example 2

When a management server (not shown) that stores the projector information of the projectors 1 to 6 exists, the projectors 1 to 6 and the control device 7 may obtain the projector information of the projectors 1 to 6 from the management server.

For example, the communication unit 113 requests the projector information of the projectors 1 to 6 from the management server, and receives the projector information of the projectors 1 to 6 transmitted from the management server in response to the request. Subsequently, the communication unit 113 outputs the projector information of the projectors 1 to 6 to the receiving unit 116*a*. When receiving the projector information of the projectors 1 to 6 from the communication unit 113, the receiving unit 116*a* outputs the projector information of the projectors 1 to 6 to the control unit 116*b* (or the control unit 116*b*1).

Modified Example 3

Although the control device 7 includes the display unit 112, the control device 7 may not include the display unit 112 but may be connected with the display unit 112.

Modified Example 4

The control device 7 may be fixed at a specific installation location.

Modified Example 5

The installation locations of the projectors 1 to 6 are not limited to the conference rooms A to C but can be appropriately changed.

Modified Example 6

The number of projectors is not limited to six but may be any number equal to or greater than two.

Modified Example 7

The content of the projector information displayed in the selection image is not limited to a name, a model number, an IP address, and installation location information, but can be appropriately changed.

Modified Example 8

In the embodiments described above, the grouping unit 116c may be omitted.

Modified Example 9

Although the projectors are used as the display devices in the embodiments, the display device is not limited to the projector but can be appropriately changed in the embodiments. For example, the display device may be a display of direct-view type.

Modified Example 10

In the embodiments described above, all of or a portion of the receiving unit 116a, the control units 116b and 116b1, and the grouping unit 116c may be realized by a dedicated electronic circuit.

Modified Example 11

In the second embodiment, since it is not clear whether or not the distance between the conference room B and the conference room A is longer than the distance between the conference room C and the conference room A, sorting is executed on the assumption that as to the projectors 4 and 5 whose installation locations are the conference room B and the projector 6 whose installation location is the conference room C, the installation locations of the projectors are different from the conference room A but are the same location. In contrast to this, when the positional information regarding the distances between the conference room A, the conference room B, and the conference room C, and the positional relationship among them are stored in the storage unit 115, sorting may be performed with the conference room B and the conference room C differentiated from each other. At this time, when the conference room B, for example, is closer to the conference room A than the conference room C, the projectors 4 and 5 whose installation locations are the conference room B may be displayed preferentially over the projector 6 whose installation location is the conference room C (displayed such that the projectors 4 and 5 are positioned above the projector 6) in the selection screen M2. The positional information may be obtained from an external storage device (not shown) via the network 100.

What is claimed is:

1. A display device comprising:
   an image display;
   a memory storing third information corresponding to an installation location of the display device; and
   a processor or circuit configured to:
      receive first information corresponding to an installation location of a first display device from the first display device, second information corresponding to an installation location of a second display device from the second display device, and the third information representing the installation location of the display device from the memory; and
      cause the image display to display an image representing the first display device preferentially over the second display device when the installation location of the first display device corresponding to the first information is closer to the installation location of the display device corresponding to the third information than the installation location of the second display device corresponding to the second information.

2. The display device according to claim 1, wherein in response to an information request from an other display device, the processor or circuit transmits the third information to the other display device.

3. The display device according to claim 1, wherein when the installation location of the first display device is the same as the installation location of the display device and the installation location of the second display device is different from the installation location of the display device, the processor or circuit causes the image display to display, as the image, a first image representing the first display device without representing the second display device.

4. The display device according to claim 1, wherein the processor or circuit causes the image display to display, as the image, a second image in which the first display device and the second display device are sorted in order of closeness to the installation position of the display device.

5. A control device connected to an image display, the control device comprising:
   a memory storing third information corresponding to an installation location of the display device; and
   a processor or circuit configured to:
      receive first information corresponding to an installation location of a first display device from the first display device, second information corresponding to an installation location of a second display device from the second display device, and the third information representing the installation location of the control device from the memory; and
      cause the image display to display an image representing the first display device preferentially over the second display device when the installation location of the first display device corresponding to the first information is closer to the installation location of the control device corresponding to the third information than the installation location of the second display device corresponding to the second information.

6. A display method performed by a display device, comprising:
   storing, in a memory, third information corresponding to an installation location of the display device;
   receiving, by a processor or circuit of the display device, first information corresponding to an installation location of a first display device from the first display device, second information corresponding to an installation location of a second display device from the second display device, and the third information representing the installation location of the display device from the memory; and
   displaying, by an image display of the display device, an image representing the first display device preferentially over the second display device when the installation location of the first display device corresponding to the first information is closer to the installation location of the display device corresponding to the third information than the installation location of the second display device corresponding to the second information.

7. A display device comprising:
   an image display; and
   a processor or circuit configured to:
      receive first information corresponding to an installation location of a first display device, second information corresponding to an installation location of a second display device, and third information corresponding to an installation location of the display device; and
      cause the image display to display an image representing the first display device preferentially over the second display device when the installation location of the first display device corresponding to the first information is closer to the installation location of the display device corresponding to the third information than the installation location of the second display device corresponding to the second information, wherein
   when the installation location of the first display device is the same as the installation location of the display device and the installation location of the second display device is different from the installation location of the display device, the processor or circuit causes the image display to display, as the image, a first image representing the first display device without representing the second display device.

8. A display device comprising:
   an image display; and
   a processor or circuit configured to:
      receive first information corresponding to an installation location of a first display device, second information corresponding to an installation location of a second display device, and third information corresponding to an installation location of the display device; and
      cause the image display to display an image representing the first display device preferentially over the second display device when the installation location of the first display device corresponding to the first information is closer to the installation location of the display device corresponding to the third information than the installation location of the second display device corresponding to the second information, wherein
   the processor or circuit causes the image display to display, as the image, a second image in which the first display device and the second display device are sorted in order of closeness to the installation position of the display device.

* * * * *